United States Patent
Smith et al.

(10) Patent No.: US 8,345,386 B2
(45) Date of Patent: Jan. 1, 2013

(54) BEARING DEVICE AND INFORMATION RECORDING AND REPRODUCING APPARATUS

(75) Inventors: Robert Gordon Smith, Pathumthani (TH); Virat Sornsiri, Pathumthani (TH)

(73) Assignee: Seiko Instruments (Thailand) Ltd. (JP)

( * ) Notice: Subject to any disclaimer, the term of this patent is extended or adjusted under 35 U.S.C. 154(b) by 330 days.

(21) Appl. No.: 12/660,737

(22) Filed: Mar. 3, 2010

(65) Prior Publication Data
US 2010/0226043 A1    Sep. 9, 2010

(30) Foreign Application Priority Data
Mar. 4, 2009    (JP) .................................. 2009-050522

(51) Int. Cl.
G11B 5/55     (2006.01)
G11B 21/08    (2006.01)
F16C 19/12    (2006.01)
F16C 35/12    (2006.01)

(52) U.S. Cl. .................. 360/265.6; 360/265.2; 384/520; 384/544

(58) Field of Classification Search .... 360/265.2–265.6; 384/490, 504, 520, 543, 544; 310/67 R, 310/90
See application file for complete search history.

(56) References Cited

U.S. PATENT DOCUMENTS

| | | | | |
|---|---|---|---|---|
| 5,999,373 A | * | 12/1999 | Allsup et al. | 360/265.6 |
| 6,033,120 A | * | 3/2000 | Obara | 384/504 |
| 7,428,125 B2 | * | 9/2008 | Deguchi et al. | 360/265.2 |
| 2009/0279211 A1 | * | 11/2009 | Seymour et al. | 360/265.6 |

FOREIGN PATENT DOCUMENTS

JP    2001099147 A   *   4/2001

OTHER PUBLICATIONS

English-machine translation of JP 2001-099147 A to Matsuzaki et al., published on Apr. 10, 2001.*
Patent Abstracts of Japan, publication No. 2001-155448, publication date Jun. 8, 2001.

* cited by examiner

*Primary Examiner* — Will J Klimowicz
(74) *Attorney, Agent, or Firm* — Adams & Wilks

(57) ABSTRACT

A bearing device has a sleeve that encircles a shaft, and two side-by-side roller bearings rotatably support the sleeve coaxially on the shaft. A spacer portion protrudes radially inwardly from the sleeve and extends between the two roller bearings. The sleeve axially overlaps a minor portion of one roller bearing but does not overlap a race surface thereof, and the sleeve axially overlaps a major portion of the other roller bearing including a race surface thereof.

15 Claims, 9 Drawing Sheets

BEARING DEVICE AND INFORMATION RECORDING AND REPRODUCING APPARATUS

BACKGROUND OF THE INVENTION

1. Field of the Invention

The present invention relates to a bearing device and an information recording and reproducing apparatus.

2. Description of the Related Art

Hitherto, an information recording and reproducing apparatus such as a hard disk has been known, which allows a disk (magnetic recording medium) to store various types of information therein and to reproduce the information therefrom. In general, the information recording and reproducing apparatus includes: a head gimbal assembly having a slider that records a signal in the disk and reproduces the signal therefrom; and an arm (rotational member) in which the head gimbal assembly is mounted on a tip end. The arm is made rotatable by a bearing device provided on a base end thereof. The arm is rotationally moved, whereby the slider is moved to a predetermined position of the disk, thus making it possible to record the signal in the disk and to reproduce the signal therefrom.

FIG. 9 is a cross-sectional view of a bearing device 10 according to a conventional technology. The bearing device 10 includes a shaft 20 and a sleeve 40, which are arranged coaxially with each other. The shaft 20 is connected to a cabinet of the information recording and reproducing apparatus, and an arm 8 of the information recording and reproducing apparatus is connected to an outer periphery of the sleeve 40. Between the shaft 20 and the sleeve 40, a pair of roller bearings 30a and 30b are arranged side by side in an axial direction. Outer peripheral surfaces of outer rings 34 of the respective roller bearings 30a and 30b and an inner peripheral surface of the sleeve 40 are fixedly adhered to each other by adhesive.

Mass of the sleeve 40 is large because the sleeve 40 is made of stainless steel. Therefore, a resonant frequency (resonance) between the sleeve 40 and the arm 8, which are rotational portions, is decreased. Accordingly, there is a problem that the resonance is prone to occur at the time when the sleeve 40 and the arm 8 move rotationally, resulting in a decrease of positioning accuracy of the slider mounted on a tip end of the arm 8.

In this connection, JP 2001-155448 A proposes a technology for increasing the resonant frequency in such a manner that a material of the sleeve is changed to aluminum to achieve weight reduction thereof.

However, the aluminum has a larger coefficient of linear expansion than the stainless steel, and accordingly, in the sleeve 40 made of the aluminum, an amount of thermal expansion thereof when a temperature thereof is high is increased. There is a problem that, if the amount of thermal expansion varies among the respective portions of the sleeve 40, distortion occurs in the respective roller bearings 30a and 30b. Such a problem includes deformation of the respective roller bearings 30a and 30b from a perfect circular shape to an oval shape. Following such an occurrence of the distortion, an amount of rotation of the arm 8 with respect to rotation torque is changed, leading to the decrease of the positioning accuracy of the slider.

Further, the adhesive that fixedly adheres the roller bearings 30a and 30b and the sleeve 40 to each other is contracted at the time of being cured. There is a problem that, if an amount of contraction of the adhesive varies among the respective portions thereof, the distortion occurs in the roller bearings 30a and 30b in a similar way to the above.

SUMMARY OF THE INVENTION

The present invention has been made in consideration of the problems as described above. It is an object of the present invention to provide a bearing device capable of achieving the weight reduction of the rotational portions and capable of suppressing the distortion of the roller bearings.

In order to solve the above-mentioned problems, a bearing device according to the present invention includes: a shaft; a sleeve arranged on an outside of the shaft while a central axis thereof coincides with a central axis of the shaft; a first roller bearing and a second roller bearing, which are arranged side by side in a direction of the central axes, for supporting the shaft and the sleeve so that the shaft and the sleeve are capable of freely moving rotationally relative to each other; and a spacer portion formed between the first roller bearing and the second roller bearing so as to protrude from an inner peripheral surface of the sleeve, in which the sleeve is formed so as not to overlap a race surface of the first roller bearing in the direction of the central axes.

According to the present invention, a length of the sleeve in the direction of the central axes is shortened, and accordingly, weight of the sleeve can be reduced. Further, it becomes possible to reduce a constituent material and machining process of the sleeve, and hence manufacturing cost thereof can be reduced.

Further, on an inner peripheral surface of an outer ring of each of the roller bearings, the race surface having a groove on the entire circumference thereof is formed on a center portion in the direction of the central axes. In this center portion, a thickness thereof in a radial direction is reduced, and accordingly, rigidity thereof is low, and the distortion is prone to occur therein. The sleeve of the present invention is formed so as not to overlap a center portion of the first roller bearing in the direction of the central axes. Accordingly, even if the sleeve is thermally expanded, the distortion of the first roller bearing can be suppressed.

Further, it is preferred that the sleeve be formed so as not to overlap the first roller bearing in the direction of the central axes.

According to the present invention, the length of the sleeve in the direction of the central axes is further shortened, and accordingly, the weight of the sleeve can be reduced. Further, the first roller bearing is hardly affected by the thermal expansion of the sleeve, and accordingly, the distortion of the first roller bearing can be prevented.

Further, it is preferred that the bearing device include a pedestal portion formed so as to protrude from an outer peripheral surface of the sleeve, in which a rotational member made freely rotatable by the bearing device is fixedly attached to a first end surface of the pedestal portion.

According to the present invention, the pedestal portion is formed so as to protrude from the sleeve, and accordingly, rigidity of the sleeve is enhanced. Therefore, even if the rotational member is thermally expanded, it becomes possible to suppress deformation of the sleeve. Following such suppression of the deformation, the distortion of each of the roller bearings can be suppressed.

Further, it is preferred that a second end surface of the pedestal portion be formed so as to be flush with an end surface of the sleeve.

According to the present invention, it becomes possible to simultaneously machine the second end surface of the pedestal portion and the end surface of the sleeve, and hence the manufacturing cost can be reduced.

Further, it is preferred that the second end surface of the pedestal portion be formed between both end surfaces of the sleeve.

According to the present invention, a height (distance between the first end surface and the second end surface) of the pedestal portion is decreased, and accordingly, weight of the pedestal portion can be reduced.

Further, it is preferred that the first end surface of the pedestal portion be formed between both end surfaces of the spacer portion.

The rigidity of the sleeve is increased in a portion on which the spacer portion is formed so as to protrude therefrom. According to the present invention, the first end surface is formed between both the end surfaces of the spacer portion, and the rotational member is fixedly attached to the first end surface. Accordingly, the rotational member can be fixedly attached to the portion of the sleeve, in which the rigidity is high. Therefore, even if the rotational member is thermally expanded, it becomes possible to suppress the distortion of the sleeve. Following the suppression of the deformation, the distortion of each of the roller bearings can be suppressed.

Further, it is preferred that the sleeve be formed so as not to overlap a race surface of the second roller bearing in the direction of the central axes.

According to the present invention, the length of the sleeve in the direction of the central axes is further shortened, and accordingly, the weight of the sleeve can be reduced. Further, the sleeve of the present invention is formed so as not to overlap the center portions of both of the roller bearings in the direction of the central axes. Accordingly, even if the sleeve is thermally expanded, the distortion of both of the roller bearings can be suppressed.

On the other hand, an information recording and reproducing apparatus according to the present invention includes: the above-mentioned bearing device; a cabinet connected to the shaft; a rotational member connected to the sleeve; and a slider mounted on the rotational member, for recording information in a magnetic recording medium and reproducing information from the magnetic recording medium.

According to the present invention, the weight of the rotational portions (sleeve, pedestal portion, and the like) of the bearing device is reduced, and accordingly, the resonant frequency among the rotational portions can be increased. In such a way, it becomes possible to suppress the resonance at the time when the rotational portions move rotationally, and positioning accuracy of the slider with respect to the magnetic recording medium can be enhanced.

Further, the distortion of the roller bearings is suppressed, and accordingly, each of the rotational members can be moved rotationally by a predetermined amount according to rotation torque. Hence, the positioning accuracy of the slider with respect to the magnetic recording medium can be enhanced.

According to the bearing device of the present invention, the length of the sleeve in the direction of the central axes is shortened, and accordingly, the weight of the sleeve can be reduced.

Further, in the end portions of each of the roller bearings, the distortion is less likely to occur than in the center portion thereof. Accordingly, even if the sleeve is thermally expanded, the distortion of the first roller bearing can be suppressed.

DETAILED DESCRIPTION OF THE PREFERRED EMBODIMENTS

A description is made below of embodiments of the present invention with reference to the accompanying drawings.
(Information Recording and Reproducing Apparatus)

Figure 1:
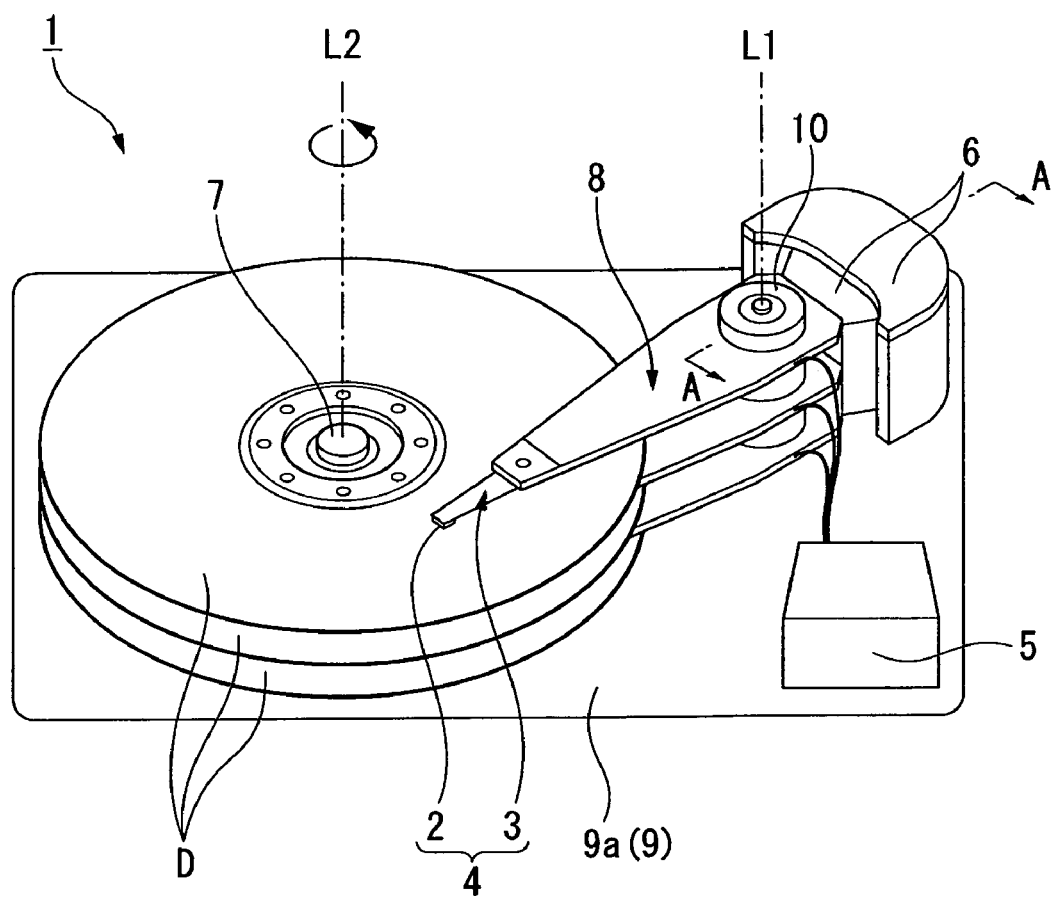
FIG. 1 is a perspective view of an information recording and reproducing apparatus of the present invention.

FIG. 1 is a perspective view of an information recording and reproducing apparatus 1. This information recording and reproducing apparatus 1 is an apparatus that performs writing to and reading from disks (magnetic recording media) D having recording layers. The information recording and reproducing apparatus 1 includes: arms (rotational members) 8; head gimbal assemblies 4 supported on tip ends of the arms 8; sliders 2 mounted on tip ends of the head gimbal assemblies 4; an actuator (voice coil motor: VCM) 6 that moves the head gimbal assemblies 4 in a scanning manner; a spindle motor 7 that rotates the disks D; a control unit 5 that supplies the sliders 2 with currents modulated in response to information; and a housing (cabinet) 9 that houses these respective components therein.

The housing 9 is made of a metal material, such as aluminum, and has a box shape with an opening in an upper portion thereof. The housing 9 is composed of a bottom 9a rectangular when viewed from above, and a peripheral wall (not shown) erected on a peripheral edge of the bottom 9a in a vertical direction with respect to the bottom 9a. In an inside of the housing 9, which is surrounded by the peripheral wall, a recessed portion that houses the above-mentioned respective components therein is formed. Note that, in FIG. 1, the peripheral wall that surrounds the housing 9 is omitted in order to make the description easy to understand. The above-described spindle motor 7 is mounted on a substantial center of the bottom 9a, and center holes of the disks D are fitted onto the spindle motor 7, whereby the disks D are freely detachably fixed thereto.

A bearing device 10 according to this embodiment is arranged on the side of the disks D. The arms 8 are fixedly attached to an outer peripheral surface of the bearing device 10. One-side ends of the arms 8, which are closer to the bearing device 10, are connected to the above-mentioned actuator 6. Further, the other-side ends of the arms 8 are extended in parallel to surfaces of the disks D, and the head gimbal assemblies 4 are connected to tip ends of the other-side ends concerned. Each of the head gimbal assemblies 4 includes: a suspension 3; and a slider 2 that is mounted onto a tip end of the suspension 3, and is arranged so as to be opposed to the surface of the disk D. The slider 2 includes: a recording element that performs the writing (recording) of information to the disk D; and a reproducing element that performs the reading (reproduction) of information from the disk D.

In order to perform the recording or reproduction of the information in the information recording and reproducing apparatus 1 configured as described above, the spindle motor 7 is first driven, and the disks D are rotated about a center axis L2. Further, the actuator 6 is driven, and the arms 8 are moved rotationally about a center axis L1 of the bearing device 10. In such a way, the sliders 2 arranged on the tip ends of the head gimbal assemblies 4 can be moved in a scanning manner to the respective portions of the surfaces of the disks D. Then, the recording elements or reproducing elements of the sliders 2 are driven, whereby the recording of the information to the disks D or the reproduction of the information from the disks D can be performed.

(Bearing Device)

Figure 2:
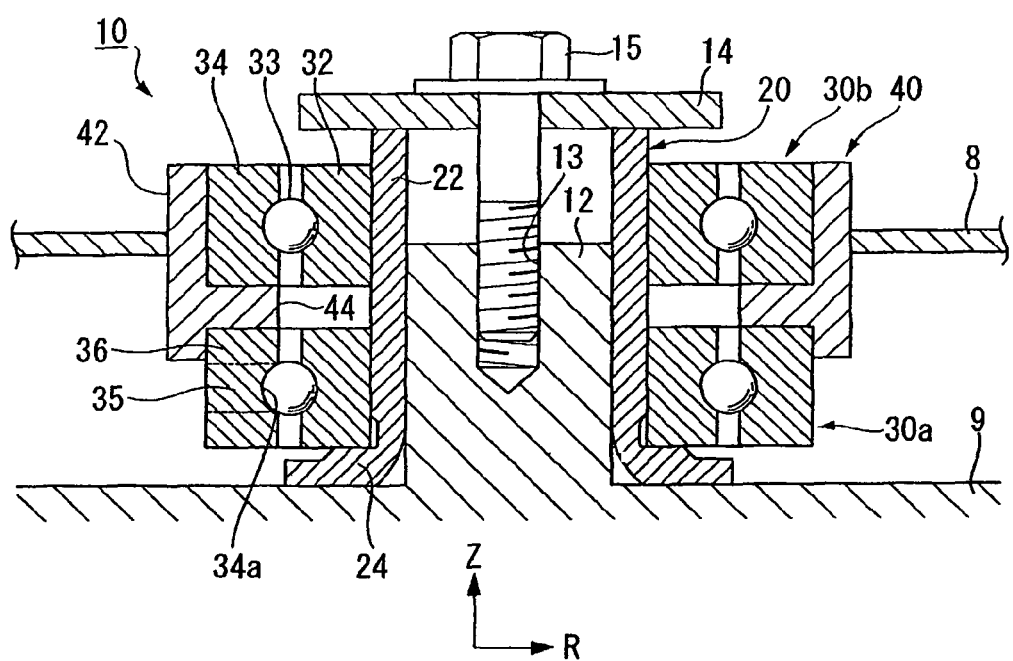
FIG. 2 is a side cross-sectional view of a bearing device according to a first embodiment of the present invention.

FIG. 2 is a side cross-sectional view of the bearing device 10 according to the first embodiment. Note that the respective drawings of FIG. 2 to FIG. 9 are cross-sectional views of portions corresponding the line A-A of FIG. 1. Though, in FIG. 1, a plurality of the arms are fixedly attached to the outer peripheral surface of the bearing device 10, in each of FIG. 2 to FIG. 9, the case where only one arm is fixedly attached thereto is illustrated. Though, in FIG. 2, a fixing structure of a shaft 20 to the housing 9 is illustrated, illustration of the fixing structure is omitted in each of the drawings of FIG. 3 to FIG. 9. In each of the drawings of FIG. 2 to FIG. 9, a direction going along a central axis of the bearing device 10 and leaving the bottom 9a of the housing is defined as a +Z-direction, and a radial direction of the bearing device 10 is defined as an R-direction.

As illustrated in FIG. 2, the bearing device 10 includes: the inner shaft 20 and an outer sleeve 40, which are arranged coaxially with each other; and a first roller bearing 30a and a second roller bearing 30b, which are arranged between the shaft 20 and the sleeve 40.

The shaft 20 is made of a metal material such as stainless steel, and includes: a cylinder portion 22; and a flange portion 24 formed on an end of the cylinder portion 22 in a −Z-direction. The cylinder portion 22 is inserted onto an outside of a protruding portion 12 of the housing 9, and the flange portion 24 abuts against the bottom 9a of the housing 9. An annular fixing member 14 is mounted onto an end surface of the cylinder portion 22 in the +Z-direction. A bolt 15 is inserted into an inside of the cylinder portion 22 through a center hole of the fixing member 14 from an outside of the fixing member 14. The bolt 15 is screwed to a female thread 13 formed on a tip end surface of the protruding portion 12. By the fixing structure described above, the shaft 20 is fixed to the housing 9.

The sleeve 40 is arranged on an outside of the shaft 20 and encircles the shaft while allowing a central axis thereof to coincide with that of the shaft 20. The sleeve 40 includes a cylinder portion 42 made of a metal material such as stainless steel. To an outer peripheral surface of the sleeve 40, the arm 8 of the information recording and reproducing apparatus is fixedly attached by adhesive, press fitting or the like.

The first roller bearing 30a and the second roller bearing 30b support the shaft 20 and the sleeve 40 so that the shaft 20 and the sleeve 40 are capable of freely moving rotationally relative to each other. Each of the roller bearings 30a and 30b includes an inner ring 32 and an outer ring 34, which are made of a metal material such as stainless steel and arranged coaxially with each other. The inner ring 32 is fixed to an outer peripheral surface of the cylinder portion 22 of the shaft 20 by the adhesive, and the outer ring 34 is fixed to an inner peripheral surface of the sleeve 40 by the adhesive. Anaerobic adhesive is used as this adhesive. The anaerobic adhesive is cured by being shielded from the air and contacting a metal. Note that it is desirable to combine heating treatment with such curing treatment of the anaerobic adhesive.

The sleeve 40 is composed of stainless steel with a small coefficient of linear expansion, and accordingly, an amount of thermal expansion of the sleeve 40 is decreased at the time when the adhesive is cured and at the time when the information recording and reproducing apparatus is used at a high temperature. Thus, distortion can be suppressed from occurring in each of the roller bearings 30a and 30b. Further, the outer rings 34 of the pair of roller bearings 30a and 30b and the sleeve 40 are both composed of stainless steel, and accordingly, the distortion can be suppressed from occurring in each of the roller bearings 30a and 30b owing to a difference in amount of thermal expansion between both of the outer rings 34 and the sleeve 40.

Between the inner ring 32 and outer ring 34 of each of the roller bearings 30a and 30b, a plurality of balls (rolling elements) 33 are arranged. On an inner peripheral surface of the outer ring 34 and on an outer peripheral surface of the inner ring 32, a race surface 34a on which the balls 33 roll is formed. The race surfaces 34a are formed into a groove shape over the entire circumference of the inner ring 32 and the outer ring 34, and a cross-sectional shape of the race surface 34a substantially coincides with an outline of the balls 33. In such a way, the balls 33 are capable of smoothly rolling along the race surface 34a while being held on the race surface 34a. Note that a similar race surface is also formed on an outer peripheral surface of the inner ring 32.

The pair of roller bearings 30a and 30b are arranged side by side in the Z-direction. A −Z-side end surface of the inner ring 32 of the first roller bearing 30a arranged on a −Z-side abuts against the flange portion 24 of the shaft 20.

Between the first roller bearing 30a and the second roller bearing 30b, a spacer portion 44 is formed so as to protrude from the inner peripheral surface of the sleeve 40. The spacer portion 44 is formed into an annular shape over the entire circumference of the sleeve 40. A +Z-side end surface of the outer ring 34 of the first roller bearing 30a arranged on the −Z-side abuts against a −Z-side end surface of the spacer portion 44. Further, a −Z-side end surface of the outer ring 34 of the second bearing 30b arranged on a +Z-side abuts on a +Z-side end surface of the spacer portion 44.

(First Embodiment)

As illustrated in FIG. 2, the sleeve 40 of the first embodiment is formed so as not to axially overlap the race surface 34a of the first roller bearing 30a in the Z-direction. In this application, the inner ring 32 and the outer ring 34 of the first and second roller bearings 30a, 30b each have a center portion 35 and end portions 36 in the Z-direction. The center portion 35 is a portion on which the race surface 34a is formed, and the end portions 36 are portions on which the race surface 34a is not formed. The sleeve 40 of this embodiment is adhered only to one of the end portions 36 of the outer ring 34 of the first bearing 30a, and is not adhered to the center portion 35 thereof. The sleeve 40, therefore, axially overlaps a minor portion of the first roller bearing 30a and does not overlap the race surfaces 34a of the roller bearing 30a, whereas the sleeve 40 axially overlaps a major portion of the second roller bearing 30b including the race surfaces of the roller bearing 30b. Even in this case, the pair of roller bearings 30a and 30b and the sleeve 40 are adhered to each other, and hence the sleeve 40 can be supported so as to be freely rotatable with respect to the shaft 20.

Figure 9:
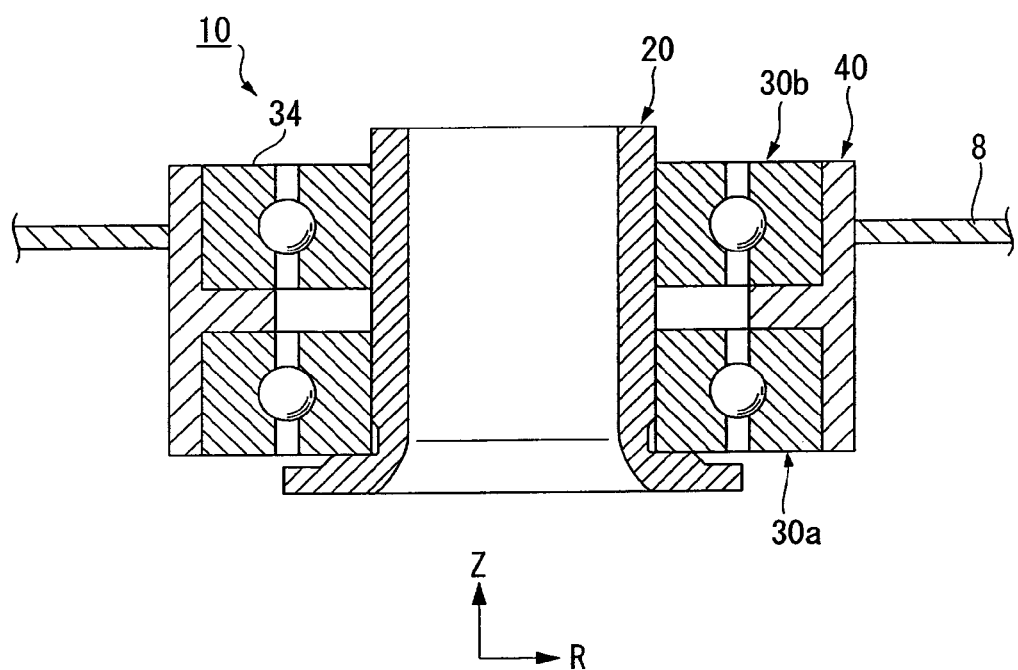
FIG. 9 is a side cross-sectional view of a bearing device according to a conventional technology.

In this embodiment, a length of the sleeve 40 in the Z-direction is shortened more than in the conventional technology illustrated in FIG. 9. Therefore, in this embodiment illustrated in FIG. 2, weight of the sleeve 40 can be reduced even if the sleeve 40 is not composed of the aluminum. In such a way, a resonant frequency between the sleeve 40 and the arm 8, which are the rotational portions, is increased, and resonance can be suppressed from occurring when the sleeve 40 and the arm 8 move rotationally. Hence, positioning accuracy of the slider with respect to the disk can be enhanced.

Further, it becomes possible to reduce a constituent material and machining process of the sleeve 40 because the length of the sleeve 40 in the Z-direction is shortened. Thus, manufacturing cost thereof can be reduced.

Note that a thickness of the end portions 36 in the R direction on which the race surface 34*a* is not formed is larger than that of the center portion 35 on which the race surface 34*a* is formed. Therefore, rigidity of the end portions 36 is higher than in the center portion 35, and the distortion is less likely to occur in the end portions 36.

The sleeve 40 of this embodiment is adhered only to one of the end portions 36 of the first roller bearing 30*a*, and is not adhered to the center portion 35 thereof. Hence, even if the sleeve 40 is thermally expanded at the time when the information recording and reproducing apparatus is used at the high temperature, the distortion of the first rollerbearing 30*a* can be suppressed. Further, even if the adhesive is contracted and the sleeve 40 is thermally expanded at the time when the adhesive itself is cured, the distortion of the first roller bearing 30*a* can be suppressed.

(Second Embodiment)

Figure 3:
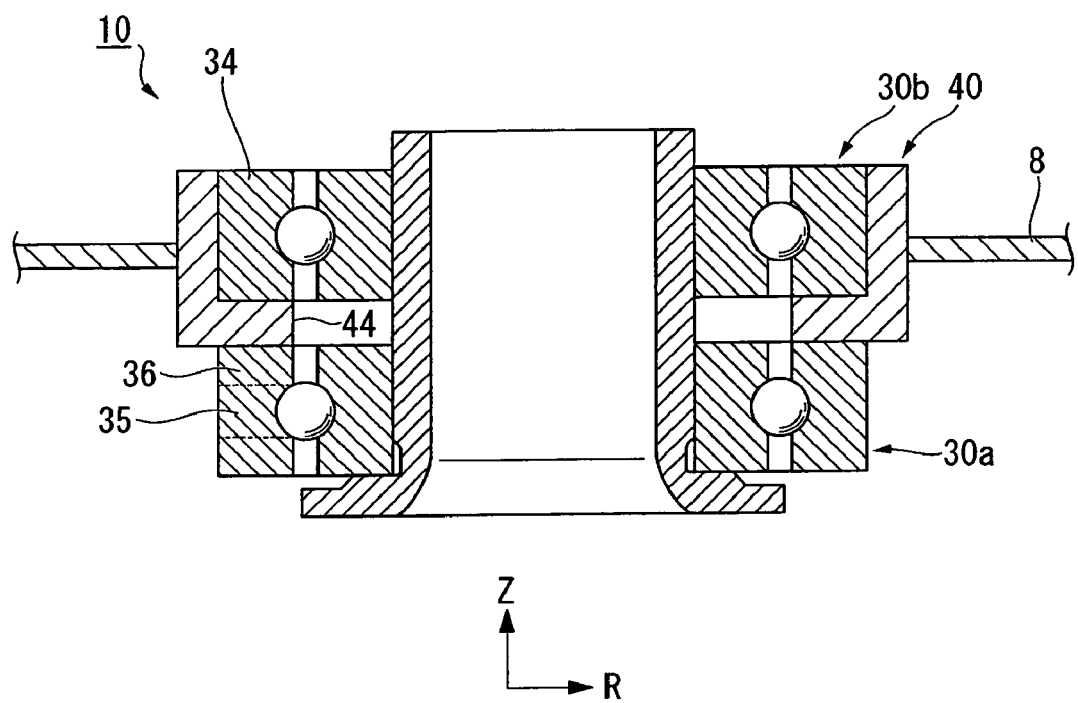
FIG. 3 is a side cross-sectional view of a bearing device according to a second embodiment of the present invention.

FIG. 3 is a side cross-sectional view of a bearing device 10 according to a second embodiment. A sleeve 40 of the second embodiment is formed so as not to overlap the first bearing 30*a* in the Z-direction. The sleeve 40 of the first embodiment, which is illustrated in FIG. 2, overlaps the end portion 36 of the first roller bearing 30*a*. The sleeve 40 of the second embodiment, which is illustrated in FIG. 3, is different from the sleeve 40 of the first embodiment in not overlapping the first roller bearing 30*a* at all. Note that the +Z-side end surface of the outer ring 34 of the first roller bearing 30*a* and the −Z-side end surface of the spacer portion 44 do not have to be joined to each other though are desirably joined by the adhesive, laser welding or the like. In the second embodiment, the length of the sleeve 40 in the Z-direction is shortened more than in the first embodiment. Therefore, the weight of the sleeve 40 is reduced, and the resonant frequency between the rotational portions is increased. Hence, the positioning accuracy of the slider with respect to the disk can be enhanced.

Further, the first roller bearing 30*a* is hardly affected by the thermal expansion of the sleeve 40. Therefore, the distortion of the first roller bearing 30*a* can be prevented.

Further, a −Z-side end surface of the sleeve 40 is formed so as to be flush with the −Z-side end surface of the spacer portion 44. In such a way, it becomes possible to simultaneously machine the −Z-side end surfaces of the sleeve 40 and the spacer portion 44, whereby manufacturing cost of the sleeve 40 can be reduced.

(Third Embodiment)

Figure 4:
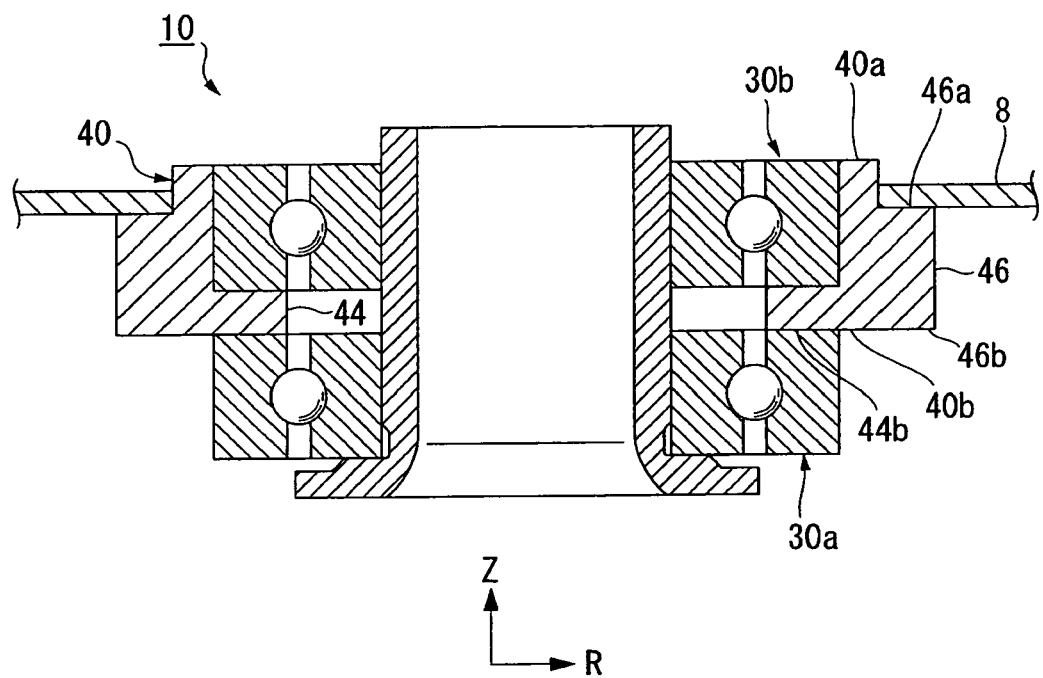
FIG. 4 is a side cross-sectional view of a bearing device according to a third embodiment of the present invention.

FIG. 4 is a side cross-sectional view of a bearing device 10 according to a third embodiment. The bearing device 10 according to the third embodiment includes a pedestal portion 46 formed so as to protrude from the outer peripheral surface of the sleeve 40. The pedestal portion 46 is formed into a cylindrical shape over the entire circumference of the sleeve 40. A +Z-side end surface (first end surface) 46*a* of the pedestal portion 46 is arranged between both end surfaces 40*a* and 40*b* of the sleeve 40. The arm 8 of the information recording and reproducing apparatus is mounted on the first end surface 46*a*, and is fixedly adhered thereto by the adhesive or the like. In the third embodiment in which the arm 8 is fixedly attached to the pedestal portion 46, the arm 8 can be supported more stably than in the first embodiment in which the arm 8 is fixedly attached to the outer peripheral surface of the sleeve 40.

In general, the arm 8 is composed of the aluminum, and hence an amount of thermal expansion thereof at the time when a temperature thereof is high is increased. Therefore, it is apprehended that the sleeve 40 may be deformed, and further, the distortion may occur in each of the roller bearings 30*a* and 30*b*. Further, in the case of fixedly attaching the arm 8 to the sleeve 40, it is apprehended that the distortion may occur in each of the roller bearings 30*a* and 30*b* owing to variations in amount of contraction of the adhesive at the time when the adhesive is cured.

In contrast, in this embodiment, the pedestal portion 46 is formed so as to protrude from the sleeve 40, and accordingly, rigidity of the sleeve 40 is enhanced. Therefore, it becomes possible to suppress deformation of the sleeve 40, and hence the distortion of each of the roller bearings 30*a* and 30*b* can be prevented.

Further, a −Z-side end surface (second end surface) 46*b* of the pedestal portion 46 is formed so as to be flush with the −Z-side end surface 40*b* of the sleeve 40 and a −Z-side end surface 44*b* of the spacer portion 44. In such a way, it becomes possible to simultaneously machine the −Z-side end surfaces of the pedestal portion 46, the cylindrical portion 42, and the spacer portion 44, whereby manufacturing cost of the sleeve 40 can be reduced.

(Fourth Embodiment)

Figure 5:
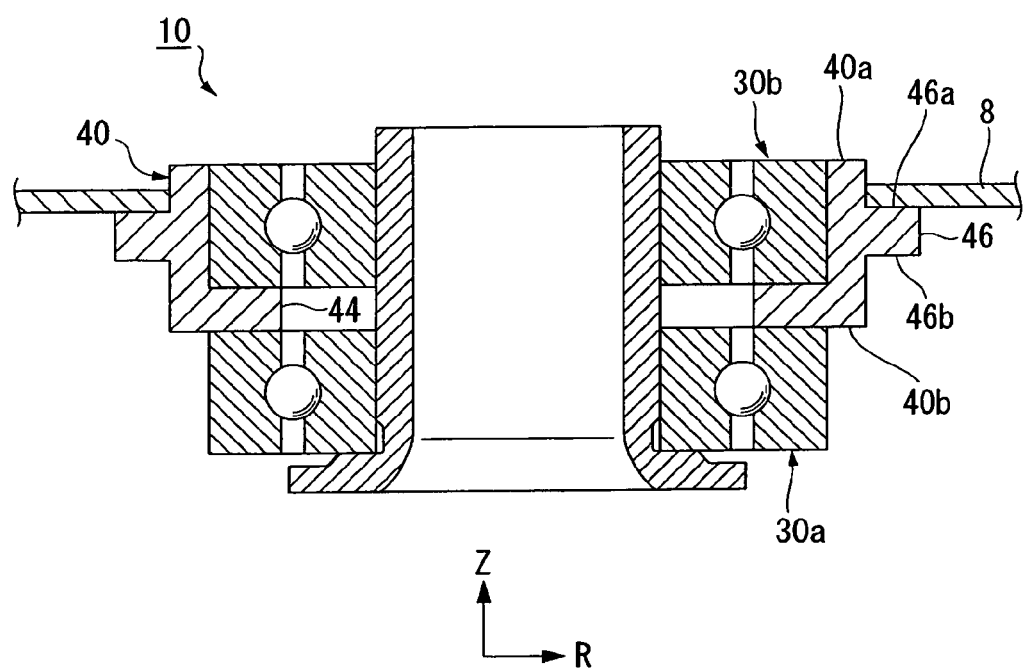
FIG. 5 is a side cross-sectional view of a bearing device according to a fourth embodiment of the present invention.

FIG. 5 is a side cross-sectional view of a bearing device 10 according to a fourth embodiment. In the fourth embodiment, the second end surface 46*b* of the pedestal portion 46 is arranged between both end surfaces 40*a* and 40*b* of the sleeve 40. In such a way, a height (distance in the Z-direction between the first end surface 46*a* and the second end surface 46*b*) of the pedestal portion 46 is decreased. Accordingly, weight of the pedestal portion 46 is reduced, and the resonant frequency between the rotational portions is increased. Hence, the positioning accuracy of the slider with respect to the disk can be enhanced.

(Fifth Embodiment)

Figure 6:
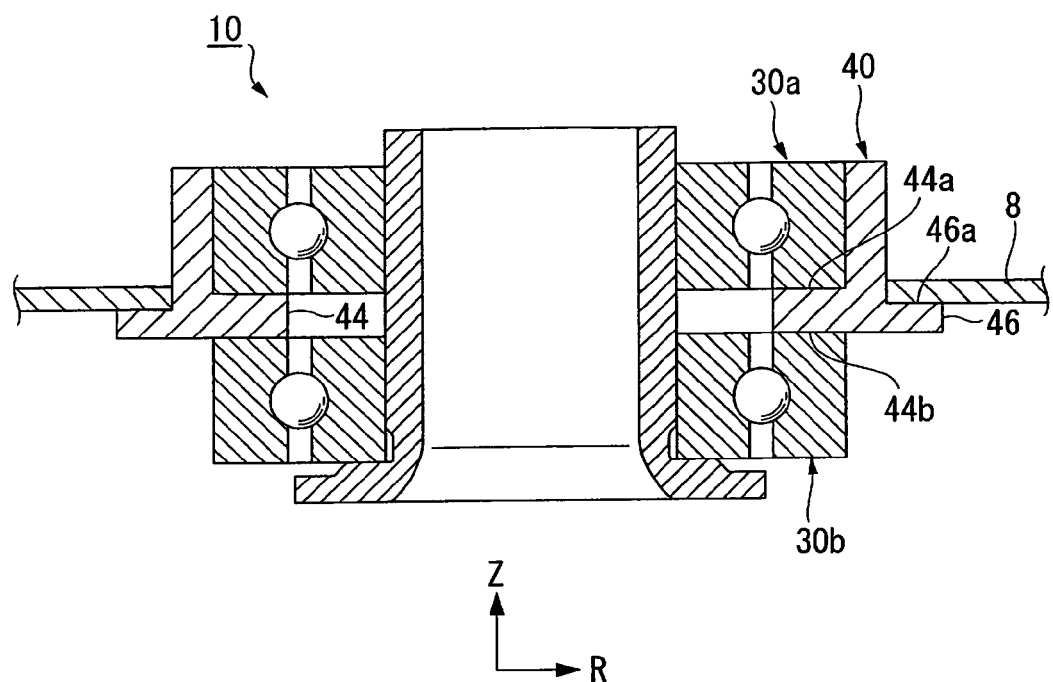
FIG. 6 is a side cross-sectional view of a bearing device according to a fifth embodiment of the present invention.

FIG. 6 is a side cross-sectional view of a bearing device 10 according to a fifth embodiment. In the fifth embodiment, the first end surface 46*a* is formed between both end surfaces 44*a* and 44*b* of the spacer portion 44, and the arm 8 is fixedly attached to the first end surface 46*a* concerned. Rigidity of the sleeve 40 is increased in a portion on which the spacer portion 44 is formed so as to protrude therefrom, and accordingly, the arm 8 can be fixedly attached to such a highly rigid portion in the fifth embodiment. Therefore, even if the amount of thermal expansion of the arm 8 is increased at the time when the temperature thereof is high, the deformation of the sleeve 40 can be suppressed. Following such suppression of the distortion, the distortion of each of the roller bearings 30*a* and 30*b* can be suppressed.

(Sixth Embodiment)

Figure 7:
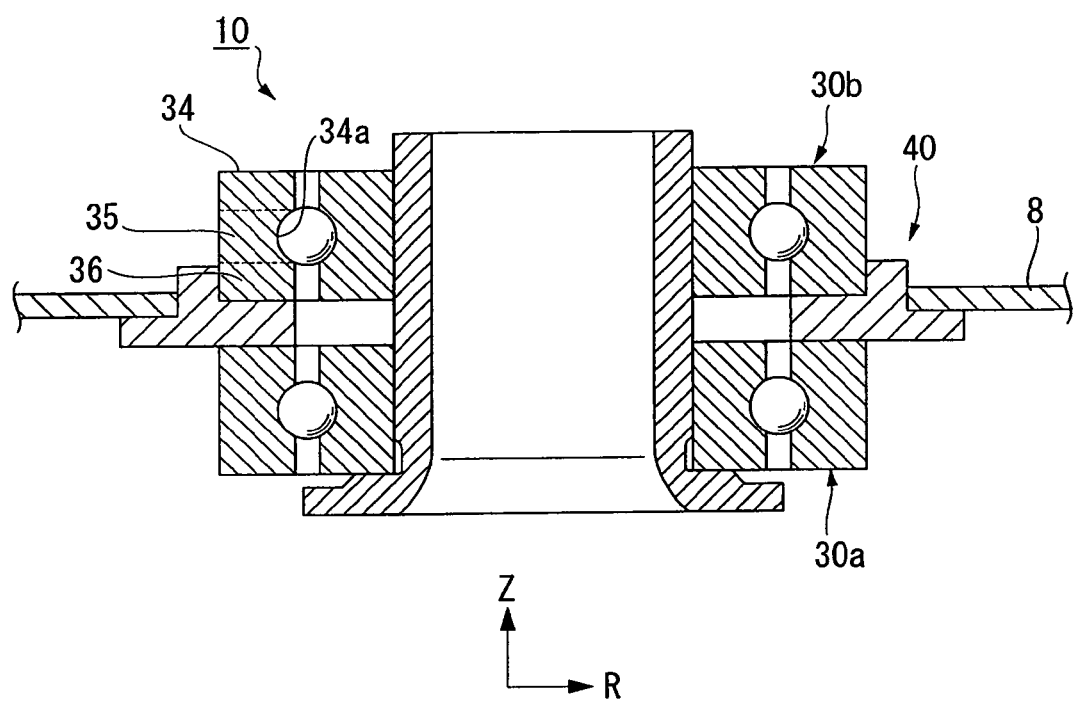
FIG. 7 is a side cross-sectional view of a bearing device according to a sixth embodiment of the present invention.

FIG. 7 is a side cross-sectional view of a bearing device 10 according to a sixth embodiment. A sleeve 40 of the sixth embodiment is formed so as not to overlap the race surface 34*a* of the second roller bearing 30*b* in the Z-direction. In other words, the sleeve 40 is adhered only to the end portion 36 of the outer ring 34 of the second roller bearing 30*b*, and is not adhered to the center portion 35 thereof. Note that the sleeve 40 does not overlap the first roller bearing 30a in the Z-direction at all.

In the sixth embodiment, the length of the sleeve 40 in the Z-direction is shortened more than in the second embodiment. Therefore, the weight of the sleeve 40 is reduced, and the resonant frequency between the rotational portions is increased. Hence, the positioning accuracy of the slider with respect to the disk can be enhanced.

Further, in the end portion 36, the distortion is less likely to occur than in the center portion 35. Accordingly, the distortion of the second roller bearing 30b can be suppressed even if the sleeve 40 is thermally expanded.

(Modified Embodiment)

Figure 8:
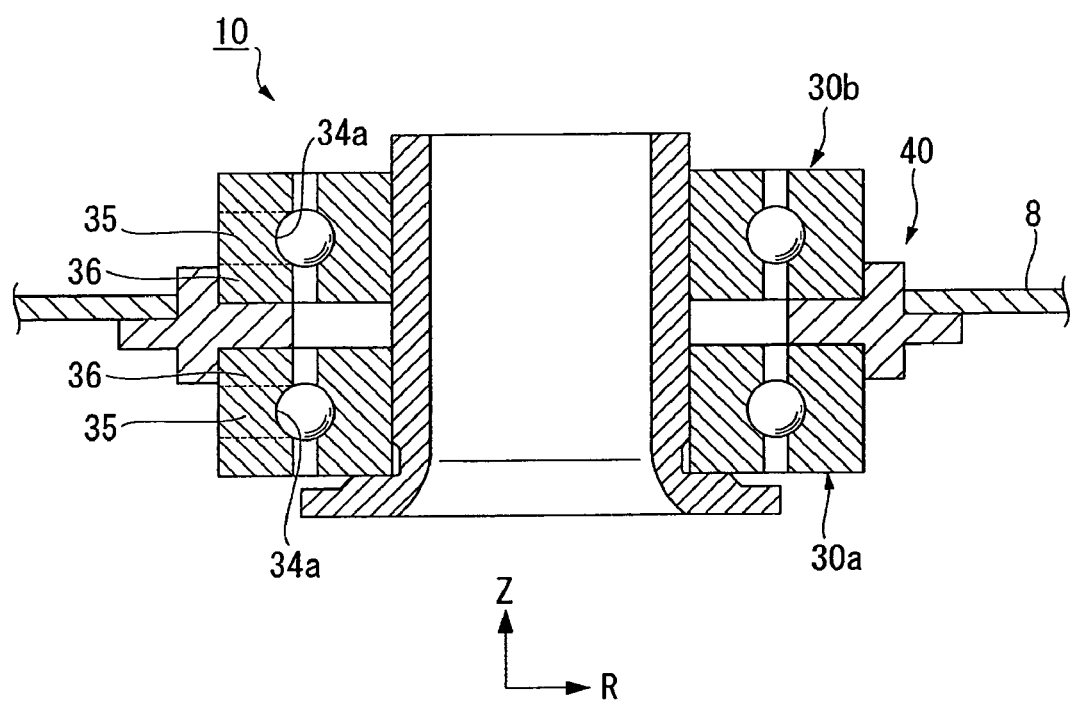
FIG. 8 is a side cross-sectional view of a bearing device according to a modification example of the sixth embodiment of the present invention.

FIG. 8 is a side cross-sectional view of a bearing device 10 according to a modified embodiment of a sixth embodiment. A sleeve 40 of the modified embodiment is formed so as not to overlap the race surface 34a of each of the roller bearings 30a and 30b in the Z-direction. In other words, the sleeve 40 is adhered only to the end portion 36 of the outer ring 34 of each of the roller bearings 30a and 30b, and is not adhered to the center portion 35 thereof.

Even in this case, similar effects to those of the sixth embodiment can be exerted.

Note that the technical scope of the present invention is not limited to the above-mentioned embodiments, and incorporates those in which a variety of alterations are added to the above-mentioned embodiments within the scope without departing from the spirit of the present invention. In other words, specific materials, layer configurations, and the like, which are mentioned in the embodiments, are merely examples, and are changeable as appropriate.

For example, the configuration of the information recording and reproducing apparatus is not limited to those described in the embodiments.

What is claimed is:

1. A bearing device, comprising:
a shaft;
a sleeve arranged on an outside of the shaft such that a central axis thereof coincides with a central axis of the shaft;
a first roller bearing and a second roller bearing, which are arranged side by side in a direction of the central axes, for supporting the shaft and the sleeve so that the shaft and the sleeve are capable of freely moving rotationally relative to each other; and
a spacer portion extending between the first roller bearing and the second roller bearing and protruding from an inner peripheral surface of the sleeve,
wherein the sleeve overlaps a portion of the first roller bearing but does not overlap a race surface of the first roller bearing in the direction of the central axes,
wherein the sleeve overlaps at least a major portion of the second roller bearing in the direction of the central axes, and wherein the first roller bearing is disposed below the spacer portion, and the second roller bearing is disposed above the spacer portion, with respect to a lower flange portion of the shaft.

2. An information recording and reproducing apparatus comprising:
the bearing device according to claim 1;
a cabinet connected to the shaft;
a rotational member connected to the sleeve; and
a slider mounted on the rotational member, for recording information in a magnetic recording medium and reproducing information from the magnetic recording medium.

3. A bearing device according to claim 1, wherein the first and second roller bearings are adhered by adhesive to the sleeve.

4. A bearing device according to claim 3, wherein the sleeve is composed of stainless steel.

5. A bearing device according to claim 4, wherein the first and second roller bearings each comprise inner and outer rings between which are arranged a plurality of rolling elements, the inner and outer rings being composed of stainless steel.

6. A bearing device according to claim 3, wherein the adhesive is an anaerobic adhesive.

7. A bearing device according to claim 1, wherein the sleeve substantially completely overlaps the second roller bearing in the direction of the central axes.

8. A bearing device according to claim 1, wherein the first and second roller bearings each comprise inner and outer rings between which are arranged a plurality of rolling elements, the inner and outer rings and the sleeve being composed of metal material which is not aluminum.

9. A bearing device, comprising:
a shaft;
a sleeve encircling the outside of the shaft, the sleeve and the shaft being coaxial with each other;
first and second roller bearings axially spaced from one another and supporting the shaft and the sleeve to undergo rotational movement relative to one another, the first and second roller bearings each having inner and outer rings having race surfaces between which are arranged rolling elements; and
a spacer portion protruding radially inwardly from the sleeve between the outer rings of the axially spaced first and second roller bearings,
wherein the sleeve axially overlaps only a minor portion of the first roller bearing and does not overlap the race surfaces thereof,
wherein the sleeve axially overlaps a major portion of the second roller bearing including the race surfaces thereof, and wherein the first roller bearing is disposed below the spacer portion, and the second roller bearing is disposed above the spacer portion, with respect to a lower flange portion of the shaft.

10. A bearing device according to claim 9; wherein the outer rings of the first and second roller bearings are adhered by adhesive to the sleeve, and the inner rings of the first and second roller bearings are adhered by adhesive to the shaft.

11. A bearing device according to claim 10, wherein the adhesive is an anaerobic adhesive.

12. A bearing device according to claim 9; wherein the sleeve substantially completely axially overlaps the second roller bearing.

13. A bearing device according to claim 9; wherein the sleeve and the inner and outer rings are composed of stainless steel.

14. A bearing device according to claim 9; wherein the sleeve and the inner and outer rings are composed of metal material other than aluminum.

15. An information recording and reproducing apparatus; comprising:
the bearing device according to claim 9;
a housing to which is connected the shaft;
an arm connected to the sleeve; and
a slider mounted on the arm for recording information to a magnetic recording medium and reproducing information from the magnetic recording medium.

* * * * *